(12) United States Patent
Chou et al.

(10) Patent No.: US 8,087,128 B2
(45) Date of Patent: Jan. 3, 2012

(54) HINGE ASSEMBLY

(75) Inventors: Yu-Cheng Chou, Taipei Hsien (TW); Jin-Xin Wang, Shenzhen (CN); Jun-Wu Duan, Shenzhen (CN); Fan Zhou, Shenzhen (CN); Ben-Gui Long, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 397 days.

(21) Appl. No.: 12/421,721

(22) Filed: Apr. 10, 2009

(65) Prior Publication Data

US 2010/0107368 A1 May 6, 2010

(30) Foreign Application Priority Data

Nov. 5, 2008 (CN) .......................... 2008 1 0305387

(51) Int. Cl.
*E05D 11/08* (2006.01)
(52) U.S. Cl. ................ 16/340; 16/360; 16/290; 16/295; 16/307

(58) Field of Classification Search .................... 16/340, 16/337, 338, 342, 289, 295, 306, 307; 248/919–923; 361/679.12, 679.27, 679.13, 679.15
See application file for complete search history.

(56) References Cited

U.S. PATENT DOCUMENTS

| | | | | |
|---|---|---|---|---|
| 2,271,422 A * | 1/1942 | Gould | ............................ | 16/294 |
| 2,535,448 A * | 12/1950 | Nowell | ............................ | 5/57.1 |
| 2,713,820 A * | 7/1955 | Horii | ............................ | 101/126 |
| 4,356,594 A * | 11/1982 | Grosemans | ..................... | 16/256 |
| 5,894,633 A * | 4/1999 | Kaneko | ............................ | 16/306 |
| 6,018,847 A * | 2/2000 | Lu | ..................... | 16/337 |
| 6,671,928 B2 * | 1/2004 | Huang | ............................ | 16/340 |
| 7,530,143 B2 * | 5/2009 | Qin et al. | ......................... | 16/285 |
| 2006/0230578 A1 * | 10/2006 | Renke et al. | ..................... | 16/289 |
| 2007/0050942 A1 * | 3/2007 | Hu | ................. | 16/340 |
| 2007/0089270 A1 * | 4/2007 | Chang et al. | .................... | 16/285 |

FOREIGN PATENT DOCUMENTS

CN 1920315 A 2/2007

* cited by examiner

*Primary Examiner* — Chuck Y. Mah
(74) *Attorney, Agent, or Firm* — Altis Law Group, Inc.

(57) ABSTRACT

A hinge assembly includes a base, a joint member, a pintle, and a coiling spring. The joint member is rotatably connected to the base. The pintle runs through the base and the joint member. The coiling spring has a first end and a second end. The first end is fixed relative to the base, and the second end is fixed relative to the joint member.

15 Claims, 2 Drawing Sheets

HINGE ASSEMBLY

BACKGROUND

1. Technical Field

The present disclosure generally relates to hinge assemblies and, particularly, to a hinge assembly used in a display monitor.

2. Description of Related Art

A liquid crystal display (LCD) display is mounted on a support. A hinge is mounted between the support and the LCD display, whereby users can adjust the angle of the LCD display. Since the support is usually much lighter than the LCD display, when the angle of the LCD display is adjusted, the support will be brought to rotate. Therefore, the user has to adjust the LCD display with one hand, and press down the support with the other hand to keep the support stationary while rotating the LCD display, which is inconvenient.

A typical hinge has a base, a pintle, at least one torsion spring, two joint members, and two washer assemblies. The base is attached to a support of an LCD display, and the pintle is mounted through the base. The torsion spring is mounted around the pintle, with one end of the torsion spring attached to the base, and the other end attached to the joint member. When the angle of the display is adjusted, the joint members rotate relative to the pintle. The support will not be rotated with the joint members because of torsion resilience provided by the torsion spring, so that the users can adjust the display angle with one hand. However, a noise is generated between the pintle and the torsion spring mounted around the pintle, especially when the pintle and the torsion spring are made of metal.

Therefore, a new hinge assembly is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
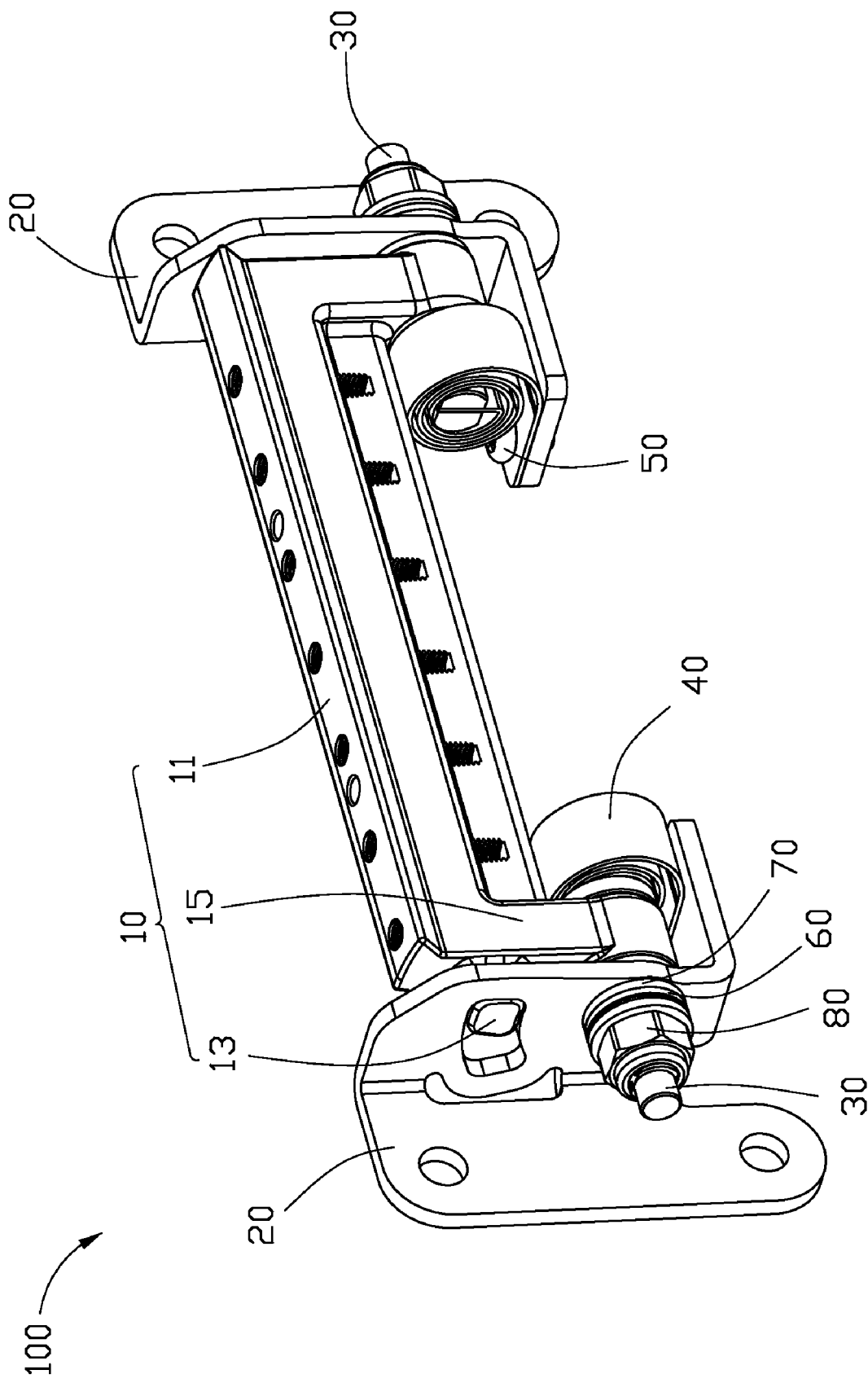
FIG. 1 is an assembled, perspective view of one embodiment of a hinge assembly.

Referring to FIG. 1, one embodiment of a hinge assembly 100 includes a base 10, two joint members 20, two pintles 30, two coil springs 40, and two washer assemblies (not labeled). Each washer assembly includes at least one elastic piece 60 and a plurality of washers 70. The joint members 20 are rotatably connected to the base 10. In the illustrated embodiment, each washer assembly includes one elastic piece 60 and three washers 70. The hinge assembly 100 further includes two fastening members 80 to be mounted at an end of the pintles 30.

Figure 2:
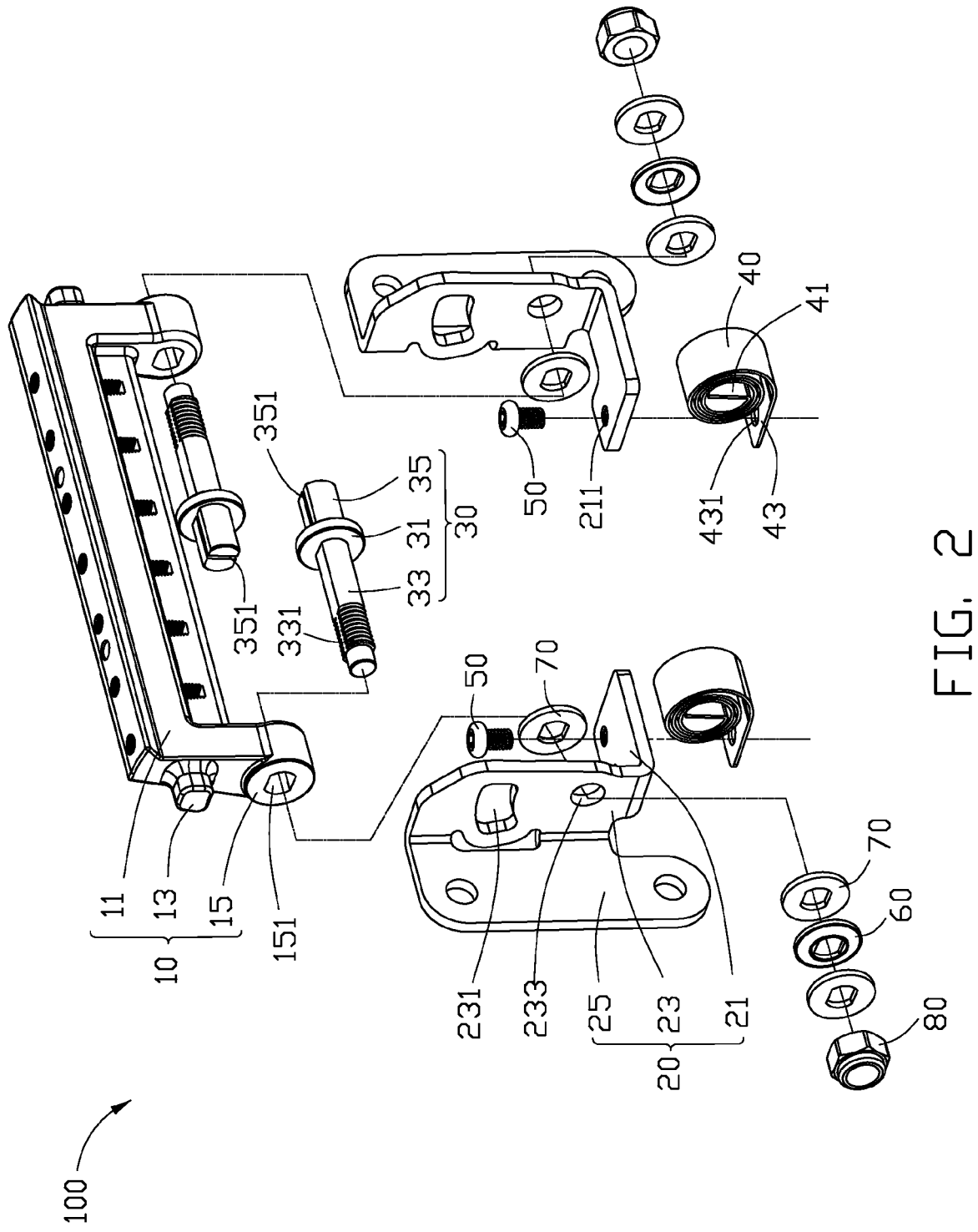
FIG. 2 is an exploded, perspective view of the hinge assembly of FIG. 1.

Referring to FIG. 2, the base 10 includes a main body 11 having a connecting portion (not labeled) and two arms (not labeled) substantially perpendicular to the connecting portion, two lugs 13, and two sleeves 15. The lugs 13 are formed on the corresponding arms of the main body 11, and the sleeves 15 are formed on ends of the corresponding arms far away from the connecting portion. Each sleeve 15 defines a shaft hole 151. In the illustrated embodiment, the shaft hole 151 is non-circular.

Each joint member 20 includes a holding wing 21, a coupling wing 23, and a fixing wing 25. The fixing wing 25 and the coupling wing 23 are substantially perpendicular to each other. The holding wing 21 extends from an end of the coupling wing 23, and is substantially perpendicular to the coupling wing 23 and the fixing wing 25. The holding wing 21 defines a threaded hole 211. The coupling wing 23 defines a curved limiting slot 231 and a pivot hole 233. The lugs 13 are slidably received in the limiting slots 231 of the corresponding joint members 20, and an engagement of the lugs 13 and the limiting slots 231 determines a rotatable angle of the joint members 20 relative to the base 10.

Each pintle 30 includes a flange 31, a shaft portion 33, and a latching portion 35. The flange 31 is positioned between the shaft portion 33 and the latching portion 35. An end of the shaft portion 33 forms a threaded portion 331. The latching portion 35 defines a latching gap 351 extending along an axis of the latching portion 35.

Each coiling spring 40 includes a first end 41 and a second end 43. The first end 41 is in a center of the coiling spring 40 and the second end 43 is a free end. The second end 43 defines a through hole 431. The first ends 41 of the coiling springs 40 are engaged in the latching gaps 351 of the pintles 30, thus fixing the first ends 41 of the coiling springs 40 to the pintles 30. A fastener 50 runs through the through hole 431 of each coiling spring 40 and engages in the threaded hole 211 of the joint member 20, thus fixing the second ends 43 of the coiling springs 40 to the joint members 20.

In the illustrated embodiment, the elastic pieces 60 may be elastic washers with a non-circular center hole. The washers 70 are ring-shaped having a non-circular center hole. The fastening members 80 may be nuts to engage with the threaded portions 331 of the pintles 30.

To assemble the hinge assembly 100, the shaft portion 331 of each pintle 30 runs through the shaft hole 151 of one of the sleeves 15 of the base 10, one washer 70, the pivot hole 233 of one of the joint members 20, one washer 70, one elastic piece 60, and one washer 70, and engages with one of the fastening members 80. The first ends 41 of the coiling springs 40 are fixed to the pintles 30, and the second ends 43 of the coiling springs 40 are fixed to the joint members 20. The pintles 30, the elastic pieces 60, the washers 70, and the fastening members 80 are fixed relative to the base 10, and the joint members 20 are rotatable relative to the base 10.

The fixing wings 25 of the joint members 20 are attached to a display monitor (not shown), and the base 10 is attached to a support (not shown). When the angle of the display monitor is adjusted, the joint members 20 rotate around the pintles 30. The lugs 13 are mounted in the limiting slots 231, and when the lugs 13 abut one end of the limiting slots 231, the display monitor can no longer rotate in this direction, thus the rotatable angle of the display monitor is limited. Given the arrangement of the coiling springs 40 mounted between the base 10 and the joint members 20, the base 10 will not rotate due to the joint members 20 with the elastic resilience provided by the coiling springs 40 that dismisses the rotation transmission from the joint members 20 to the base 10. Thus, the angle of the display monitor can be adjusted using one hand. In addition, no friction exists between the pintles 30 and the coiling springs 40, because attaching portions of the pintles 30 and the coiling springs 40 do not move relative to each other. Therefore, no noise is generated in the hinge assembly 100.

In an alternative embodiment, the first end 41 of the coiling spring 40 may be fixed to the base 10.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge assembly, comprising:
   a base;
   a first joint member comprising a coupling wing and a holding wing extending from an end of the coupling wing, the coupling wing defining a pivot hole, the holding wing defining a threaded hole;
   a first pintle non-rotatably running through the base and rotatably running through the pivot hole of the first joint member thereby rotatably connecting the first joint member to the base; and
   a first coiling spring having a first end and a second end, wherein the first coiling spring is a flat coil spring, the first end is fixed to the first pintle, and the second end defines a through hole and is fixed to the first joint member via a fastener, the fastener runs through the through hole of the second end of the first coiling spring and engages in the threaded hole of the first joint member, thus fixing the second end of the first coiling spring to the first joint member.

2. The hinge assembly of claim 1, wherein the first end is in a center of the coiling spring and the second end is a free end.

3. The hinge assembly of claim 1, further comprising a fastening member mounted at an end of the first pintle, and a first washer assembly comprising an elastic piece and a plurality of washers; the washer assembly is sleeved on the first pintle.

4. The hinge assembly of claim 3, further comprising a second pintle, a second coiling spring, a second joint member, a second washer assembly, and a second fastening member; the second joint member, the second washer assembly, and the second fastening member are sleeved on the second pintle; the second joint member is rotatably connected to the base via the second pintle opposite to the first joint member, and comprises a coupling wing and a holding wing extending from an end of the coupling wing, the coupling wing defines a pivot hole, the holding wing defines a threaded hole; the second coiling spring is a flat coil spring, a first end of the second coiling spring is fixed to the second pintle and the opposite second end of the second coiling spring defines a through hole and is fixed to the second joint member via a fastener; the fastener runs through the through hole of the second end of the second coiling spring and engages in the threaded hole of the second joint member thereby fixing the second end of the second coiling spring to the second joint member.

5. The hinge assembly of claim 4, wherein the base comprises two lugs, and each joint member defines a limiting slot; the lugs are slidably received in the limiting slots of the joint members, and an engagement of the lugs and the limiting slots determines a rotatable angle of the joint members relative to the base.

6. The hinge assembly of claim 5, wherein the base comprises a main body having a connecting portion and two arms substantially perpendicular to the connecting portion, the lugs, and two sleeves; the lugs are formed on the arms of the main body, and the sleeves are formed on ends of the arms away from the connecting portion; each sleeve defines a shaft hole to allow the pintle running therethrough.

7. The hinge assembly of claim 6, wherein each joint member further comprises a fixing wing extending from an end of the coupling wing and is substantially perpendicular to the coupling wing; the coupling wing defines the limiting slot.

8. The hinge assembly of claim 3, wherein said pintle comprises a shaft portion, a latching portion, and a flange positioned between the shaft portion and the latching portion.

9. The hinge assembly of claim 8, wherein an end of the shaft portion of the pintle forms a threaded portion, the fastening member is a nut engaged with the threaded portion.

10. The hinge assembly of claim 8, wherein the latching portion of the pintle defines a latching gap extending through an axis of the latching portion; the first end of the coiling spring is engaged in the latching gap.

11. A hinge assembly, comprising:
    a base comprising a main body having a connecting portion and two arms substantially perpendicular to the connecting portion, and two sleeves formed on ends of the arms away from the connecting portion; each sleeve defining a non-circular shaft hole;
    two pintles;
    two joint members rotatably connected to the two sleeves of the base via the two pintles; each joint member comprising a coupling wing and a holding wing extending from an end of the coupling wing, the coupling wing defining a pivot hole to allow the pintle to run therethrough, the holding wing defining a threaded hole; and
    two coiling springs oppositely mounted to the two pintles and further fixed to the two joint members respectively, each coiling spring being a flat coil spring and having a first end and a second end defining a through hole, wherein the first end of each coiling spring is fixed to one corresponding first pintle, and the second end of each coiling spring is fixed to one corresponding first joint member via a fastener, the fastener runs through the through hole of the second end of the corresponding coiling spring and engages in the corresponding threaded hole of one joint member, thereby fixing the second end of the coiling spring to the corresponding joint member.

12. The hinge assembly of claim 11, further comprising two fastening members to be mounted at an end of the two pintles, and two washer assemblies sleeved on the two pintles; each washer assembly having an elastic piece and a plurality of washers.

13. The hinge assembly of claim 12, wherein the base comprises two lugs formed on the arms of the main body, and each joint member defines a limiting slot; the lugs are slidably received in the limiting slots of the joint members, and an engagement of the lugs and the limiting slots determines a rotatable angle of the joint members relative to the base.

14. The hinge assembly of claim 13, wherein the each joint member further comprises and a fixing wing extending from an end of the coupling wing and is substantially perpendicular to the coupling wing; the coupling wing defines the limiting slot.

15. The hinge assembly of claim 12, wherein the two pintles each comprises a shaft portion, and a latching portion, and a flange positioned between the shaft portion and the latching portion.

* * * * *